United States Patent
Yang

(10) Patent No.: US 7,307,113 B2
(45) Date of Patent: Dec. 11, 2007

(54) FLUOROSULFONIC ACID ORGANIC POLYMERS

(75) Inventor: Zhenyu Yang, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/477,341

(22) PCT Filed: May 14, 2001

(86) PCT No.: PCT/US01/15604

§ 371 (c)(1),
(2), (4) Date: Jul. 29, 2004

(87) PCT Pub. No.: WO02/092646

PCT Pub. Date: Nov. 21, 2002

(65) Prior Publication Data

US 2004/0266924 A1    Dec. 30, 2004

(51) Int. Cl.
B01J 31/40 (2006.01)
B01J 27/53 (2006.01)
C07F 7/04 (2006.01)
C07C 315/04 (2006.01)
C25B 11/04 (2006.01)
C08F 16/24 (2006.01)

(52) U.S. Cl. .............. 524/262; 526/243; 502/168; 502/151; 502/217; 524/262

(58) Field of Classification Search ............. 526/243; 502/168; 524/262
See application file for complete search history.

(56) References Cited

U.S. PATENT DOCUMENTS

| | | | |
|---|---|---|---|
| 3,282,875 A * | 11/1966 | Connolly et al. | 524/795 |
| 4,358,545 A | 11/1982 | Ezzell et al. | |
| 4,904,701 A | 2/1990 | Hiyoshi et al. | |
| 5,371,150 A | 12/1994 | Osawa et al. | |
| 5,633,098 A * | 5/1997 | Narang et al. | 429/104 |
| 5,766,787 A | 6/1998 | Watanabe et al. | |
| 5,870,920 A * | 2/1999 | Drigani et al. | 72/247 |
| 5,879,828 A * | 3/1999 | Debe et al. | 429/41 |
| 5,958,822 A * | 9/1999 | Beckerbauer et al. | 502/168 |
| 6,140,436 A * | 10/2000 | Doyle et al. | 526/243 |
| 6,395,673 B1 * | 5/2002 | Harmer et al. | 502/158 |

FOREIGN PATENT DOCUMENTS

EP    0879851 A1    11/1998
JP    1 54005889    1/1979

OTHER PUBLICATIONS

PCT/US01/15604 International Search Report Dated Feb. 13, 2002.
K. A. Mauritz et al., Perfluorinated-Ionomer-Membrane-Based Microcomposites, Multiphase Polymer Materials: Ionomers and Blends, ACS, Chapter 16, 1989.
Q. Deng et al., Nafion/(SiO2, Ormosil, and Dimethylsiloxane) Hybrids via in Situ Sol-Gel Reactions: Chatacterization of Fundamental Properties, J. Appl. Poly,Er Science 68, p. 747-763, 1998.
Weijin Li et al., Covalently Interlinked Organic Led Transport Layers via Spin-Coating/Siloxane Condensation, Adv. Matter, 11, No. 9, 1999.
James H. Clark et al., Catalysis of Liquid Phase Organic Reactions Using Chemically Modified Mesopoorous Inorganic Solids, Chem Commun., 1998.
Mark A. Harmer et al., Solid Acid Catalysts, Chem. Commun., p. 1803-1804, 1997.

* cited by examiner

Primary Examiner—Duane Smith
Assistant Examiner—Ives Wu

(57) ABSTRACT

The present invention provides for a composition and a process for forming the composition. The composition comprises an organic polymer and 0.5-40% by weight of the composition of a siloxane, the organic polymer having a fluorinated backbone and 3-20 mol-% of pendant groups represented by the formula (I): $-O_p-[CF(R_f^1)CF-O_m]_n-CF_2CF_2SO_3X$; wherein $R_f$ is F or $_2CF_2SO_3X$; wherein $R_f$ is F or a perfluoroalkyl radical having 1-10 carbon atoms either unsubstituted or substituted by one or more ether oxygen atoms, m=0 or 1, n=0 to 3, p=0 or 1, and X is H or an alkali metal; the siloxane comprising two or more groups which need not be the same represented by the formula (II): $-O_aSi(OH)_{b-a}R^1{}_{3-b}R^2R_f^2SO_3$; wherein a=1; 1 to b, b=1 to $R^1$ is a non-hydrolyzable group independently selected from the group consisting of alkyl, cycloalkyl, aryl and aralkyl, X is is an alkali metal or hydrogen, $R^2$ is a bidentate alkylene radical either unsubstituted or substituted by at least one ether oxygen atom with the proviso that $R^2$ has at least two carbon atoms linearly disposed between Si and $R_f^2$, and $R_f^2$ is a perfluoroalkylene ether radical either unsubstituted or substituted by at least one ether oxygen atom.

23 Claims, No Drawings

FLUOROSULFONIC ACID ORGANIC POLYMERS

FIELD OF THE INVENTION

Copolymers of tetrafluoroethylene (TFE) with fluorovinyl sulfonyl fluorides are modified by introduction of a modified alkoxysilane represented by the formula $(RO)_3SiRR_fSO_2F$, followed by hydrolysis. The hydrolyzed material, principally the acid or lithium salt form, is formed into a shaped article exhibiting high ionic conductivity and improved barrier to methanol permeation. The shaped articles provided according to the invention are useful in lithium batteries and direct methanol fuel cells.

BACKGROUND OF THE INVENTION

It has long been known in the art to form single ion conducting polymer electrolyte membranes and gels from organic polymers known as ionomers which contain ionic pendant groups. Such membranes and gels are useful in electro-chemical applications such as batteries, electrolyzers, and fuel cells. In widespread commercial use are Nafion® membranes available from E. I. du Pont de Nemours and Company. Nafion® is formed by copolymerizing tetra-fluoro ethylene (TFE) with perfluoro(3,6-dioxa-4-methyl-7-octenesulfonyl fluoride), as disclosed in U.S. Pat. No. 3,282,875. Also known are copolymers of TFE with perfluoro (3-oxa-4-pentene sulfonyl fluoride), as disclosed in U.S. Pat. No. 4,358,545. The copolymers so formed are converted to the ionomeric form by hydrolysis, typically by exposure to an appropriate aqueous base, as disclosed in U.S. Pat. No. 3,282,875. Hydrogen, lithium, sodium and potassium are all well known in the art as suitable cations for the above cited ionomers.

It will be appreciated by one of skill in the art that the higher the concentration of ionically conductive moieties in said membranes or gels (that is, the lower the equivalent weight, EW, of the associated ionomer) the higher the conductivity of the membrane, and the better the electrochemical performance of the cell in which it is incorporated.

In the art of direct methanol fuel cells (DMFCs) it is found that the membranes are highly susceptible to "methanol crossover"—diffusion of methanol across the membrane into the oxygen-rich section—which degrades cell performance. It is further recognized in the art that within a given family of ionomers, methanol crossover is worst for low EW membranes—the very membranes which are desired for highest conductivity.

One approach to the problem has been to fabricate layered membrane structures, alternating between high and low EW membranes in an attempt to retard methanol crossover without sacrificing too much in the way of conductivity.

Mauritz et al, Multiphase Polymer Materials: Ionomers and Blends, ACS Symposium Series #395, Utracki and Weiss (ed.), Chapter 16, American Chemical Society, Washington D.C., 1989, and Deng et al., J. Appl. Polym. Sci, 68, 747-763 (1998) disclose a method for forming perfluoroionomer membrane-based nanocomposites by dissolving solutions of tetra-alkoxysilanes, alkylalkoxysilanes, and mixtures thereof in solvent swollen perfluorosulfonic acid membranes, followed by in situ hydrolysis, followed in turn by condensation and drying to form domains of approximately 5 nm or less in scale of organically modified silica homogeneously dispersed in the perfluorosulfonic acid membrane at a concentration of approximately 10% by weight. The resultant membranes are said to have potential utility in fuel cells. The membranes exhibit reduced methanol uptake compared to a control.

Beckerbauer et al., U.S. Pat. No. 5,958,822, discloses a method for synthesizing modified silanes having the formula $X_nR^1{}_{3-n}SiR^2R_fSO_2F$ wherein $R^1$ is a non-hydrolyzable group such as alkyl or acyl, X is a hydrolyzable group including halogen, alkoxy, or acyloxy, $R^2$ is an alkylene radical having at least two carbons linearly between Si and $R_f$, $R_f$ is a perfluoroalkylene ether radical, and n=1 to 3. The sulfonyl fluoride functionalized silane compositions thus produced may then be hydrolyzed by methods therein disclosed to a composition having the formula $(HO)_3SiR^2R_fSO_3K$, which is readily converted to the sulfonic acid by acid exchange. The acid form is then applied to a surface to serve as a supported acid catalyst.

In Harmer et al, Chem. Commun., 1997, pp. 1803f, the hydrolyzed silane sulfonate of Beckerbauer, op. cit., is co-condensed with a tetralkoxysilane in a sol-gel process to form a functionalized silica network. One, two and three-dimensional networks formed by sol-gel processes from alkoxysilanes co-condensed with organically modified alkoxy silanes are known in the art. See, for example, Li et al., Adv.Mater. 11, 730-734, (1999), a review paper by Clark and Macquarrie, Chem. Commun. 1998, 853-860, and Harmer et al., Chem. Comm. 1997, 1803-1804. Harmer, in particular, provides a method for synthesizing $(OC_2H_4)_3Si(CH_2)_3(CF_2)_2O(CF_2)_2SO_2F$, hydrolyzing and co-condensing with a solution of hydrolyzed tetramethylsiloxane to form a form a fluorosulfonic acid functionalized silica network useful in catalysis.

Watanabe et al., U.S. Pat. No. 5,766,787, discloses a Nafion® perfluorosulfonic acid membrane formed as a composite containing both a catalyst such as platinum, and up to 50%, but in practice, only 5%, by weight of an oxide such as silica. The silica is in the form of a dense particulate of approximately 7 nm particle size. The composite membrane is said to be useful in fuel cells by reducing the requirements for humidifying the gaseous reactants, with the oxide specifically providing an improvement over the metal oxide-free catalyst/Nafion® composite by improving water retention. Fuel cell performance of a catalyst-free, metal oxide free Nafion® membrane was superior to the claimed membrane when humidified feed was employed. Further, the elimination of humidification of the feed resulted in >50% degradation of performance for both claimed and prior art membranes.

SUMMARY OF THE INVENTION

The present invention provides for a composition comprising an organic polymer and about 0.5-40% by weight of the composition of a siloxane, the organic polymer having a fluorinated backbone and about 3-20 mole % of pendant groups represented by the formula (I)

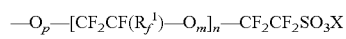

wherein $R_f^1$ is F or a perfluoroalkyl radical having 1-10 carbon atoms either unsubstituted or substituted by one or more ether oxygen atoms, m=0 or 1, n=0 to 3, p=0 or 1, and X is H or an alkali metal; the siloxane comprising two or more groups which need not be the same represented by the formula (II)

 (II)

wherein a=1 to b, b=1 to 3, $R^1$ is a non-hydrolyzable group independently selected from the group consisting of alkyl, cycloalkyl, aryl and aralkyl, X is an alkali metal or hydrogen, $R^2$ is a bidentate alkylene radical either unsubstituted or substituted by one or more ether oxygen atoms with the proviso that $R^2$ has at least two carbon atoms linearly disposed between Si and $R_f^2$, and $R^2$ is a perfluoroalkylene ether radical either unsubstituted or substituted by one or more ether oxygen atoms.

Further provided is a composition comprising an organic polymer and 0.5-40% by weight of the composition of a silane, the organic polymer having a fluorinated backbone and 3-20 mole % of pendant groups represented by the formula (III)

—$O_p$—[$CF_2CF(R_f^1)$—$O_m$]$_n$—$CF_2CF_2SO_3M$ wherein $R_f$ is F or a perfluoroalkyl radical having 1-10 carbon atoms either unsubstituted or substituted by one or more ether oxygen atoms, m=0 or 1, n=0 to 3, p=0 or 1, and M is an alkali metal; the silane comprising two or more groups which need not be the same represented by the formula (IV)

$(YO)_bSi\ R^1_{3-b}R^2R_f^2SO_2Z$ (IV)

wherein b=1 to 3, $R^1$ is a non-hydrolyzable group independently selected from the group consisting of alkyl, cycloalkyl, aryl and aralkyl, Y is is an alkali metal or alkyl radical, $R^2$ is a bidentate alkylene radical either unsubstituted or substituted by one or more ether oxygen atoms with the proviso that $R^2$ has at least two carbon atoms linearly disposed between Si and $R_f^2$, $R_f^2$ is a perfluoroalkylene ether radical either unsubstituted or substituted by one or more ether oxygen atoms, and Z is F or —OM where M is an alkali metal.

The present invention further provides for a process for a composition, the process comprising the steps of:

contacting an organic polymer with a polar solvent, the polymer having a fluorinated backbone and about 3-20 mole % of pendant groups represented by the formula (1) to form a solvent swollen polymer composition having a solvent concentration of about at least 5% by weight of the composition;

contacting said composition with a silane to form a blend, the silane being represented by the formula (IV).

DETAILED DESCRIPTION

While the present invention has utility in numerous electrochemical applications such as batteries, electrolysis cells, and fuel cells, it has particular utility in direct methanol fuel cells where it provides a solution to the methanol cross-over problem by providing compositions of high EW ionomers with enhanced conductivity derived from the incorporation of an ionically conductive silica therewithin.

In one embodiment of the present invention, suitable for use in fuel cells, is provided an ionically conductive composition comprising an organic polymer and 0.5-40% by weight of the composition of a siloxane, the organic polymer having a fluorinated backbone and 3-20 mole % of pendant groups represented by the formula (I)

—$O_p$—[$CF_2CF(R_f^1)$—$O_m$]$_n$—$CF_2CF_2SO_3X$ wherein $R_f^1$ is F or a perfluoroalkyl radical having 1-10 carbonatoms either unsubstituted or substituted by one or more ether oxygen atoms, m=0 or 1, n=0 to 3, p=0 or 1, and X is H or an alkali metal; the silane being represented by the formula (II)

—$O_aSi(OH)_{b-a}R^1_{3-b}R^2R_f^2SO_3X$ (II)

wherein a=1 to b, b=1 to 3, $R^1$ is a non-hydrolyzable group independently selected from the group consisting of alkyl, cycloalkyl, aryl and aralkyl, $R^2$ is a bidentate alkylene radical either unsubstituted or substituted by one or more ether oxygen atoms with the proviso that $R^2$ has at least two carbon atoms linearly disposed between Si and $R_f^2$, $R_f^2$ is a perfluoroalkylene ether radical either unsubstituted or substituted by one or more ether oxygen atoms, and X is H or an alkali metal.

Preferably the composition comprises 5-20%, most preferably 10-15% by weight of the siloxane. Preferably p=1, $R_f^1$ is trifluoromethyl, m=1, n=0 or 1, a=3, b=3, $R^2$ is ethenyl, $R_f^2$ is $CF_2CF_2OCF_2CF_2$—, and X is H.

In a further embodiment, the siloxane is a co-condensate comprising the modified siloxane represented by formula (II) and a conventional siloxane of the formula —$O_iSi(OH)_4i$, preferably where i=4.

Organic polymers preferred for the composition of the invention are represented by the formula (V)

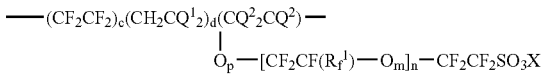

where c≧0, d≧0 and 4≦(c+d)≦199, $Q^1$ and $Q^2$ are F or H, $R_f^1$ is F or a perfluoroalkyl radical having 1-10 carbon atoms either unsubstituted or substituted by one or more ether oxygen atoms, m=0 or 1, n=0 to 3, p=0 or 1, and X is H or an alkali metal. More preferably $R_f^1$ is $CF_3$, p=1, m=1, n=1, and X is H. Preferably the pendant group is present at a concentration of 3-10 mol-%.

In one preferred embodiment, $Q^1$ is H, d≧0, and $Q^2$ is F, which may be synthesized according to the teachings of Connolly et al., U.S. Pat. No. 3,282,875. In another preferred embodiment, $Q^1$ is H, $Q^2$ is H, p=0, $R_f^1$ is F, m=1, n=1, and X is H, which may be synthesized according to the teachings of co-pending application Ser. No. 60/105,662. Still other embodiments may be synthesized according to the various teachings in Drysdale et al., WO 9831716(A1), and co-pending US applications Choi et al., WO 99/52954(A1), and 60/176,881.

According to the present invention, the siloxane network is intimately blended with the ionomer. This is achieved according to the process of the invention by infusion of the precursor silane into the solvent swollen polymer, effectively filling the voids between the swollen polymer chains, followed by in situ formation of the siloxane network or gel.

In a first step in one embodiment of the process of the invention, an ionomer (V), preferably in the form of a film or membrane, is contacted with a polar, protic solvent such as alcohol, polar ether, nitrile, or water, or a mixture thereof. Suitable solvents include, methanol, ethanol, propanol, tetrahydrofuran, acetonitrile, and water. Preferred is a approximately 50/50 mixture of water and methanol. Any form of contacting will result in swelling of the ionomer, however, immersing the membrane into an excess of solvent is preferred. Sufficient solvent should be available to cause the membrane to take up an amount of solvent equal to at least 5% of the dry weight of the membrane. Preferably, the membrane will absorb at least 80% of solvent on the same basis, most preferably greater than 100% of solvent.

The membrane may be soaked in solvent at room temperature, but a temperatures between room temperature and approximately 80° C. is preferred in order to increase both the total solvent uptake and the rate of uptake. Soaking times ranging from 10 minutes to approximately 16 hours have been found to be satisfactory with the shorter times associated with the higher temperatures.

In a second step in the process of the invention, the thus-swollen ionomer is contacted with a modified silane (IV). It is preferred that the absorbed solvent not be removed from the ionomer prior to this step. The silane (IV) is a liquid when Y is an alkyl radical and Z is F, the alkoxysilanesulfonyl fluoride form, and is preferred. Any form of contacting will result in the infusion of the silane (IV) into the solvent-swollen ionomer. However, it is preferred to immerse the solvent swollen ionomer into an excess of the liquid silane.

When the silane (IV) is in the salt form, that is, when Y is an alkali metal and Z is M where M is an alkali metal, the oxyalkalisilane sulfonate form, it must first be dissolved in a solvent which is also compatible with the ionomer. Suitable solvents are the same as those employed to swell the ionomer, as hereinabove cited.

The temperature for conducting the second step of the process of the invention may be in the range of approximately 0° C. to the boiling point of the silane or silane sulfonate salt solution. However 20-60° C. is preferred.

It is satisfactory to perform the silane absorption step at room temperature in air. Suitable for the practice of the invention are absorption levels of silane ranging from 0.5%-40% by weight of the total composition, with 5-20% preferred, and 10-15% most preferred. These absorption levels are achieved typically in the within 5 minutes to four hours. As a general rule, the lower the EW of an ionomer characterized by particular backbone and pendant group, the more rapid and more extensive the uptake of silane. However, it is preferred to practice the present invention with relatively high EW ionomers in order to provide high resistance to methanol permeability. It is also found in the practice of the invention, that the beneficial effects thereof are most pronounced in higher EW films.

In one embodiment of the process of the invention, X in the ionomer (V) is an alkali metal—that is, the ionomer is a sulfonate salt. In this embodiment, the product so formed is a stable intermediate comprising the alkoxysilane sulfonyl fluoride or the oxyalkalisilane sulfonate and the sulfonate ionomer in an unreacted blend.

In another embodiment of the process of the invention, X in the ionomer (V) is hydrogen—that is, the ionomer is a sulfonic acid. In this embodiment, the alkoxysilane sulfonyl fluoride or oxyalkalisilane sulfonate is converted in the presence of the acid to the hydroxysilane sulfonyl fluoride or hydroxysilane sulfonic acid. The hydroxy silane compositions thus formed will, according to the teachings of the art, in the acid environment, further spontaneously condense in situ to form a siloxane network intimately mixed with the ionomer according to the present invention.

While spontaneous condensation will occur at room temperature in the presence of the ionomer sulfonic acid, it is preferred to heat the composition to a temperature of up to 100° C. in order to achieve complete condensation in relatively shorter periods of time. Similarly, particularly in the case of relatively high equivalent weight ionomers, it is preferred to contact the composition with additional acid to ensure complete conversion to the hydroxy form at relatively higher rates than would be achieved without the addition of acid. Trifluoroacetic acid is suitable for this purpose as are other strong acids.

In the case of the sulfonyl fluoride form of the siloxane network, it is possible to employ the resultant membrane in a fuel cell, but it is preferred to further hydrolyze the sulfonyl fluoride moiety by treatment according to the teachings of the art by treatment with a strong base such as a methanol/water solution of KOH at room temperature.

After this treatment, both the ionomer and the siloxane will be in the sulfonate salt form, suitable for use as ion exchange resins. However, before application to fuel cells, the resulting composition would then need to be treated with additional strong acid, such as $HNO_3$ to perform an acid exchange and render the composition suitable for use in fuel cells.

One of skill in the art will appreciate that various combinations of the steps herein outlined may be performed. For example, the final, sulfonic acid form composition produced according to the process of the invention which is most preferred for employment in a fuel cell may be arrived at by first forming the stable intermediate hereinabove described wherein the alkoxysilane sulfonyl fluoride is combined with the sulfonate ionomer, then treating the stable intermediate so formed with a strong base to convert the alkoxysilane sulfonyl fluoride in the composition to the oxyalkalisilane sulfonate, followed by treatment of the composition with acid to convert the ionomer to the acid form, and the oxyalkalisilane sulfonate to the hydroxyalkalisilane sulfonic acid which then spontaneously condenses to the siloxane sulfonic acid. But it is also possible to first treat the alkoxysilane sulfonyl fluoride with a strong base to convert it to the oxyalkalisilane sulfonate prior to combining with the ionomer sulfonate. Then the silane and ionomer are combined already in salt form to form a second stable intermediate which need only be treated with acid to form the final composition of the process of the invention. Other variations in treatment order may also be performed such as are convenient in the particular application.

In a preferred embodiment, a relatively high equivalent weight ionomer (V) in sulfonic acid form, preferably an equivalent weight equivalent to a concentration of the pendant group of less than 10 mole-%, although not less than 3 mol-%, is swollen in an excess of a methanol/water solution heated to a temperature of approximately 80° C. to absorb approximately 100% by weight of solvent with respect to the weight of the ionomer. The resulting swollen composition is then immersed in an excess of neat trimethoxysilane sulfonyl fluoride liquid at approximately 60° C. to achieve an uptake of 10-15% by weight silane with respect to the weight of the total composition. The resulting composition is contacted with an amount of trifluoroacetic acid and heated to approximately 100° C., thereby forming the siloxane sulfonyl fluoride. The resulting composition is washed in de-ionized water and then treated with a strong base to convert the sulfonyl fluoride to the sulfonate (and concomitantly, the sulfonic acid ionomer to the sulfonate) followed by treatment with strong acid such as aqueous $HNO_3$ to form the final sulfonic acid composition of the invention preferred for employment in a fuel cell.

One of skill in the art will appreciate that the process hereinabove described may be repeated several times, depending upon the particular exigencies of the application in question. For example, an unmodified tetralkoxysilane may be blended with and condensed within a swollen ionomer, and therewithin condensed to a siloxane to form a composite according to the teachings of Mauritz et al., op.cit. The composite so formed may then be once again subject to swelling (of the ionomer moiety) and further contacted with the sulfonyl-fluoride modified silane of Beckerbauer et al., op.cit., U.S. Pat. No. 5,958,822, according to the teachings of the present invention. The modified silane may be neat or in a mixture with an unmodified tetraalkoxysilane.

Other such combinations and permutations of the process steps of the invention may also be made.

EXAMPLES

In the following examples Nafion® perfluoroionomer membranes were employed. Nafion® is available from the DuPont Company, Wilmington, Del. Two grades of Nafion® were used, Type 151 which is a 1500 equivalent weight film approximately 25.4 micrometers in thickness, and Type 105 which is a 1000 equivalent weight film approximately 127 micrometers in thickness. Specimens approximately 2"×2" square (5 cm×5 cm) were employed as described below.

Following the teachings of Beckerbauer et al, op.cit., U.S. Pat. No. 5,958,822, $(CH_3O)_3SiCH_2CH_2CF_2CF_2OCF_2CF_2SO_2F$ was prepared as follows. To a stirred mixture of 85 g (0.2 mol) of $ICF_2CF_2OCF_2CF_2SO_2F$ available from the Shanghai Institute of Organic Chemistry, Shanghai, China, and 32 g (0.215 mol) of $(CH_3O)_3SiCH=CH_2$ (Aldrich Chemical Company) was added 0.5 g of benzoyl peroxide (Aldrich) at 90 to 95° C. in $N_2$ and the resulting mixture was stirred at 95° C. for 40 minutes. An additional 0.5 g of benzoyl peroxide was added and the mixture was stirred for 4 hours more and then evacuated to remove excess starting materials. After the mixture was cooled to room temperature, 59 g of $(C_4H_9)_3SnH$ was slowly added and the mixture was stirred at room temperature overnight and distilled to give 60.9 g of liquid $(CH_3O)_3SiCH_2CH_2CF_2CF_2OCF_2CF_2SO_2F$ having a purity of greater than 99% and boiling point of 55° C./3 mm Hg. $^{19}F$ NMR($CDCl_3$): +44.9 (s, 1F), −82.6 (m, 2F), −87.4 (m, 2F), −112.6 (s, 2F), −120.7 (t, J=15 Hz, 2F), $^1HNMR$: 3.60 (s, 9H), 2.10 (m, 2H), 0.70 (m, 2H).

Further following the teachings of Beckerbauer et al, op. cit., U.S. Pat. No. 5,958,822, $Cl_2CH_3SiCH_2CH_2CF_2CF_2OCF_2CF_2SO_2F$ was prepared as follows: To a stirred mixture of 85 g (0.2 mol) of $ICF_2CF_2OCF_2CF_2SO_2F$ and 30 g (0.212 mol) of $(CH_3O)_3SiCH=CH_2$ heated to 90-95° C. in $N_2$ were added three aliquots 0.5 g each of benzoyl peroxide at intervals of 30-45 minutes, and the final mixture was stirred at 95° C. for approximately one hour. The mixture was then evacuated to remove excess starting materials. 57 g of $(C_4H_9)_3SnH$ was then slowly added and the mixture was stirred at room temperature overnight and distilled to give 33.1 g of pure liquid $Cl_2CH_3SiCH_2CH_2CF_2CF_2OCF_2CF_2SO_2F$, bp 63° C./3 mmHg.

Conductivity of the subject membrane was determined by impedance spectroscopy by which is measured the ohmic (real) and capacitive (imaginary) components of the membrane impedance. Impedance was determined using the model EIS 900 Impedance Analyzer having a frequency range 10 Hz to 105 Hz available from Gamry Instruments, Inc., Warminster, Pa., utilizing a conductivity cell having a cell constant of 202.09, as described in J Phys. Chem., 1991, 95, 6040 and available from Fuel Cell Technologies, Albuquerque, N.Mex.

Prior to the conductivity measurement, a membrane was boiled in deionized water for one hour prior to testing. The conductivity cell was submersed in water at 25+1° C. during the experiment.

The impedance spectrum was determined from 10 Hz to $10^5$ Hz at 0 VDC, and 100 mv (rms) AC. The real impedance that corresponded to the highest (least negative) imaginary impedance was determined.

Conductivity was calculated from the equation:

conductivity=cell constant/[(real impedance)*(film thickness)]

Comparative Examples 1 and 2

The conductivities were determined for unmodified Nafion® films of various EW's. Results are shown in Table 1:

Conductivity data for various EW Nafion® films.

TABLE 1

| Conductivity of Commercial Nafion ® Films | |
| --- | --- |
| 1000EW | 0.11–0.12 S/cm |
| 1100EW | 0.1 S/cm |
| 1500EW | 0.04 S/cm |

Example 1

In this example, Nafion® 151 is treated with $(CH_4O)_3SiCH_2CH_2CF_2CF_2OCF_2CF_2SO_2F$ at 60° C.

Two 2×2 inch (5×5 cm) specimens of Nafion® 151 films (0.235 g) were immersed in $CH_4OH$ (50 ml) at 60° C. for 2 hours. The films were removed from the $CH_4OH$ and then were immersed at 60° C. for 30 minutes in 4.0 g of $(CH_4O)_3SiCH_2CH_2CF_2CF_2OCF_2CF_2SO_2F$ prepared as above. The films were removed from the solution and placed on a Teflon sheet. Three drops of $CF_3CO_2H$ were evenly applied over the surface of the films. The films were kept at room temperature in air for 30 minutes, then placed under vacuum in an oven at 60° C. overnight, and then, still under vacuum in the oven, heated to 100° C. for 4 hours. The films were then surface rinsed with $CH_4OH$ and immersed in 10% KOH in $CH_4OH/H_2O/CH_3—S(=O)—CH_3$ (5/4/1) at room temperature overnight in air. The films were then surface rinsed with water and then the films were immersed an excess of 10% $HNO_3$ at 60° C. for 1.5 hours in each of two aliquots, and then surface washed with deionized water followed by boiling in deionized water for 1.5 hours. Conductivity was 0.055 S/cm.

Example 2

Treatment of Nafion® 151 with $(CH_4O)_3SiCH_2CH_2CF_2CF_2OCF_2CF_2SO_2F$ at 60° C.

Following the general procedures of Example 1, two 2×2 inch (5×5 cm) specimens of Nafion® 151 film (0.281 g) were immersed in $CH_4OH$ (50 ml) at 60° C. for 30 minutes. The films were then immersed in $(CH_4O)_3SiCH_2CH_2CF_2CF_2OCF_2CF_2SO_2F$ (4.8 g) at 60° C. for 20 minutes. The films were placed on a Teflon sheet, which was kept at 60° C. on a hot plate in air for 3 hours and at 100° C. for 14 hours in a vacuum oven. The films were washed with $CH_4OH$ and immersed in 10% KOH in $CH_4OH/H_2O/CH_3—S(=O)—CH_3$ (5/4/1) at room temperature overnight. After being washed with water, the films were immersed in 10% $HNO_3$ and then washed and boiled in deionized water. Conductivity was 0.0627 S/cm in water.

Example 3

Treatment of Nafion® 151 with $(CH_4O)_3SiCH_2CH_2CF_2CF_2OCF_2CF_2SO_2F$

Following the general procedures of Example 1, two 2×2 inch (5×5 cm) specimens of Nafion® 151 film (0.258 g) were immersed in $CH_4OH$ at room temperature overnight, followed by immersion in $(CH_4O)_3SiCH_2CH_2CF_2CF_2OCF_2CF_2SO_2F$ (3.2 g) at room temperature for 30 minutes. The films were removed from the solution, washed with $CH_4OH$ for 1 to 2 seconds and placed on a Teflon sheet. The sheet was kept at 100° C. for 7 hours in an vacuum oven. The films were washed with $CH_4OH$ and immersed in 10% KOH in $CH_4OH/H_2O/CH_3$—$S(=O)$—$CH_3$ (5/4/1) at room temperature overnight, After being washed with water, the films were immersed in 10% $HNO_3$ and then washed and boiled in deionized water. Conductivity was 0.0513 s/cm in water.

Example 4

Treatment of Nafion® 151 with $(CH_4O)_3SiCH_2CH_2CF_2CF_2OCF_2CF_2SO_2F$ and $Cl_2CH_4SiCH_2CH_2CF_2CF_2OCP_2CF_2SO_2F$ Following the general procedures of Example 1, two 2×2 inch (5×5 cm) specimens of Nafion® 151 film (0.268 g) were immersed in $CH_4OH$ at room temperature (room temperature) for one hour, the films were then immersed in $(CH_4O)_3SiCH_2CH_2CF_2CF_2OCF_2CF_2SO_2F$ (0.3 g) and $Cl_2CH_4SiCH_2CH_2CF_2CF_2OCF_2CF_2SO_2F$ (2.5 g) at room temperature for 1 hour. The films were removed from the solution, washed with $CH_4OH$ for 1 to 2 seconds and placed on a Teflon sheet. The sheet was kept at 100° C. for 7 hours in a vacuum oven. The films were washed with $CH_4OH$ and immersed in 10% KOH in $CH_4OH/H_2O/CH_3$—$S(=O)$—$CH_3$ (5/4/1) at room temperature overnight. After being washed with water, the films were immersed in 10% $HNO_3$ and then washed and boiled in deionized water. Conductivity was 0.0513 s/cm in water.

Example 5

Treatment of Nafion® 105 with $(CH_4O)_3SiCH_2CH_2CF_2CF_2OCF_2CF_2SO_2F$

A solution of $(CH_4O)_3SiCH_2CH_2CF_2CF_2OCF_2CF_2SO_2F$ (5.2 g) and KOH (5.0 g) in a mixture of $CH_4OH$ (10 ml) and $H_2O$ (8 ml) was prepared by stirring at room temperature for 2 hours. Following the general procedures of Example 1, two Nafion® 105 films (2×2 inches, 5×5 cm) were immersed in the solution so formed at room temperature for 5 minutes and dried at 1001° C. for 5 minutes. After being washed with 4% HCL, the films was dried at 100° C. for 10 minutes and then immersed in the solution again for 5 minutes. After being dried at 100° C. for 5 minutes, the films were quickly washed with 4% HCl again and dried at 80° C. in an oven overnight. The films were treated with 10% $HNO_3$ at 70° C. for 2 hours, washed with deionized water and boiled in deionized water for one hour. Inductively Coupled Plasma (ICP) analysis showed that the film contained 0.36% silicon and conductivity was 0.13 S/cm.

Example 6

Treatment of Nafion® 105 with $(CH40)_3SiCH_2CH_2CF_2CF_2OCF_2CF_2SO_2F$ and $Cl_2CH_4SiCH_2CH_2CF_2CF_2OCF_2CF_2SO_2F$ A solution of $(CH_4O)_3SiCH_2CH_2CF_2CF_2OCF_2CF_2SO_2F$ (1.0 g) and $Cl_2 CH_4SiCH_2CH_2CF_2CF_2OCF_2CF_2SO_2F$ (4.5 g) and KOH (5.5 g) in $CH_4OH$ (12 ml) and $H_2O$ (8 ml) was prepared by stirring at room temperature for 1 hour. Following the general procedures of Example 1, two Nafion® 105 film specimens (2×2 inches, 5×5 cm) were immersed in the solution so formed at room temperature for one hour. The films were removed from the solution, treated with $CF_3CO_2H$ and placed on a Teflon sheet. The sheet was kept at 100° C. for 5 hours in a vacuum oven. The films were washed with $CH_4OH$ and immersed in 10% KOH in $CH_4OH/H_2O/CH_3$—$S(=O)$—$CH_3$ (5/4/1) at room temperature overnight. After being washed with water, the films were immersed in 10% $HNO_3$ and then washed and boiled in deionized water for 2 hours. Conductivity was 0.131 S/cm in water.

Example 7

Treatment of Nafion® 105 with $(CH_4O)_3SiCH_2CH_2CF_2CF_2OCF_2CF_2SO_2F$

Following the general procedures of Example 1, two specimens of Nafion® 105 film (2×2 inches, 5×5 cm, 1.288 g) were immersed in $(C_2H_4O)_4S_1$ and $CH_4OH$ (5 ml) for 10 minutes. and then immersed for 20 minutes in a solution of $(KO)_3SiCH_2CH_2CF_2CF_2OCF_2CF_2SO_3K$, prepared by reaction of $(CH_4O)_3SiCH_2CH_2CF_2CF_2OCF_2CF_2SO_2F$ (5.2 g) with KOH (5.0 g) in $CH_4OH$ (10 ml) and $H_2O$ (8 ml) at room temperature for 2 hours. The films were removed from the solution and briefly dried at 80° C. in air, then treated with 4% HCl, and kept at 80° C. for 5 h in a vacuum oven. The films were immersed in 10% KOH in $CH_4OH/H_2O/CH_3$—$S(=O)$—$CH_3$ (5/4/1) at room temperature overnight. After being washed with water, the films were immersed in 10% $HNO_3$ and then washed and boiled in deionized water for 2 hours. ICP analysis indicated that the film contained 0.29% silicon. Conductivity was 0.1207 S/cm in water.

Example 8

Treatment of Nafion® 105 with $(CH_4O)_3SiCH_2CH_2CF_2CF_2OCF_2CF_2SO_2F$

Following the general procedures of Example 1, two 2×2 inch specimens (5×5 cm) of Nafion® 105 film (1.252 g) were immersed in $CH_4OH$ at room temperature for 20 minutes, the films were then immersed in $Si(OC_2H_4)_4$ for 10 minutes and then washed with $CH_4OH$ for 1 to 2 seconds and heated at 70° C. for 4 minutes. The films were then immersed in $(CH_4O)_3SiCH_2CH_2CF_2CF_{20}CF_2CF_2SO_2F$ at room temperature for 30 minutes. The films were removed from the solution, washed with $CH_4OH$ for 1 to 2 seconds and kept at 120° C. for 6 hours in a vacuum oven under partial vacuum. The films were immersed in 10% KOH in $CH_4OH/H_2O/CH_3$—$S(=O)$—$CH_3$ (5/4/1) at room temperature overnight. After being washed with water, the films were immersed in 10% HNO3 and then washed and boiled in deionized water for 1.5 hours. Conductivity was 0.095 S/cm in water.

Example 9

Treatment of Nafion® 105 with $(CH_4O)_3SiCH_2CH_2CF_2CF_2OCF_2CF_2SO_2F$

Following the general procedures of Example 1, four specimens of Nafion® 105 film (2.398 g) were immersed in 5 to 1 ratio of $CH_4OH$ and water at 60° C. for 1.5 hours. After being dried with paper towel, the films were immersed in 5.0 g of $(CH_4O)_3SiCH_2CH_2CF_2CF_2OCF_2CF_2SO_2F$ in a jar. The jar was sealed and rotated at room temperature for 30 minutes. The films were removed from the solution and kept at 100° C. for 30 minutes at atmospheric pressure, and then in a vacuum oven under partial vacuum for 3 hours. After being washed with $CH_4OH$, the films were kept at 100° C. for 4 hours in the vacuum oven to give 2.808 g of films (17.1% weight increase). Two of the films were immersed in 5% $K_2CO_3$ in 1 to 2 ratio of $CH_4OH$ and water at room temperature for 5 hours. After being washed with water, the films were immersed in 10% $HNO_3$ and then washed and boiled in deionized water for 1.5 hours. Conductivity was 0.121 S/cm in water.

Example 10

Treatment of Nafion® 117 with $(CH_4O)_3SiCH_2CH_2CF_2CF_2OCF_2CF_2SO_2F$

Following the general procedures of Example 1, three specimens of Nafion® 105 film (2.56 g) were immersed in 5 to 1 ratio of $CH_4OH$ and water at room temperature overnight. After being dried with paper towel, the films were immersed in 5.0 g of $(CH_4O)_3SiCH_2CH_2CF_2CF_2OCF_2CF_2SO_2F$ in a jar. The jar was sealed and rotated at room temperature for 30 minutes. The films were removed from the solution and kept in a vacuum oven under partial vacuum for 6 hours. After being washed with $CH_4OH$ and 10% $HNO_3$, the films were kept at 100° C. for 4 hours in the vacuum oven to give 3.488 g of films (36.2% weight increase). R indicated that the films contained $SO_2F$ groups (1468 cm$^{-1}$). Two of the films were treated with 10% $HNO_3$ at 50° C. for 30 minutes, washed with water and boiled in deionized water. Conductivity was 0.0763 S/cm. Another film was immersed in 5% $K_2CO_3$ in 1 to 2 ratio of $CH_4OH$ and water at room temperature overnight. After being washed with water, the films were treated with 10% $HNO_3$ at 60° C. for 1.5 hours twice and then washed with deionic water and boiled in deionic water for 1.5 hours. Conductivity was 0.0936 S/cm in water.

What is claimed:

1. A composition comprising an intimate blend of an organic polymer and 0.5-40% by weight of the composition of a siloxane, the organic polymer having a fluorinated backbone and 3-20 mol-% of pendant groups represented by the formula (I)

wherein $R_f^1$ is F or a perfluoroalkyl radical having 1-10 carbon atoms either unsubstituted or substituted by one or more ether oxygen atoms, m=0 or 1, n=0 to 3, p=0 or 1, and X is H or an alkali metal; the siloxane comprising two or more groups which need not be the same represented by the formula (II)

$$-O_aSiR^2R_f^2SO_3X \qquad (II)$$

wherein a=3 X is is an alkali metal or hydrogen, $R^2$ is a bidentate alkylene radical either unsubstituted or substituted by at least one ether oxygen atom with the proviso that $R^2$ has at least two carbon atoms linearly disposed between Si and $R_f^2$, and $R_f^2$ is a perfluoroalkylene ether radical either unsubstituted or substituted by at least one ether oxygen atom.

2. The composition of claim 1 comprising 10-15% by weight of the siloxane.

3. The composition of claim 1 wherein p=1, $R_f^1$ is trifluoromethyl, m=1, n=0 or 1, $R^2$ is ethenyl, $R_f^2$ is $—CF_2CF_2OCF_2CF_2—$, and X is H.

4. The composition of claim 1 further comprising units of -O1Si(OH)4-i, where i is 1 to 4.

5. The composition of claim 1 wherein the organic polymer is represented by the formula

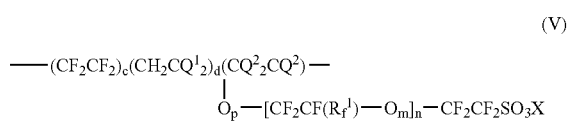

where $c \geq 0 d \geq 0$, and $4(c+d) \geq 199$, $Q^1$ and $Q^2$ are F or H, $R_f^1$ is F or a perfluoroalkyl radical having 1-10 carbon atoms either unsubstituted or substituted by one or more ether oxygen atoms, m=0 or 1, n=0 to 3, p=0 or 1, and X is H or an alkali metal.

6. The composition of claim 5 wherein $R_f^1$ is $CF_3$, p=1, m=1, n=1, and X is H.

7. The composition of claim 6 wherein $Q^1$ is H, $d \geq 0$, and $Q^2$ is F.

8. The composition of claim 5 wherein $Q^1$ is H, $Q^2$ is H, p=0, $R_f^1$ is F, m=1, n=1, and X is H.

9. The composition of claim 1 wherein the organic polymer comprises 3-10 mol-% of the pendant groups.

10. The composition of claim 5 wherein the organic polymer comprises 3-10 mol-% of the pendant groups.

11. A composition comprising an intimate blend of an organic polymer and 0.5-40% by weight of the composition of a silane, the organic polymer having a fluorinated backbone and 3-20 mol-% of pendant groups represented by the formula (III):

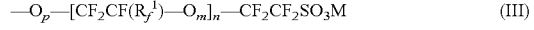

wherein $R_f^1$ is F or a perfluoroalkyl radical having 1-10 carbon atoms either unsubstituted or substituted by one or more ether oxygen atoms, m=0 or 1, n=0 to 3, p=0 or 1, and M is an alkali metal; the silane comprising two or more groups which need not be the same represented by the formula (IV)

$$(YO)_bSiR^2R_f^2SO_2Z \qquad (IV)$$

wherein b=3, Y is an alkali metal or alkyl radical, $R_2$ is a bidentate alkylene radical either unsubstituted or substituted by one or more ether oxygen atoms with the proviso that $R_2$ has at least two carbon atoms linearly disposed between Si and $R_f^2$, $R_f^2$ is a perfluoroalkylene ether radical either unsubstituted or substituted by one or more ether oxygen atoms, and Z is F or OM where M is an alkali metal.

12. A process for forming a composition, the process comprising the steps of contacting an organic polymer with a polar solvent to form a solvent swollen polymer composition containing voids, wherein the solvent swollen polymer composition has a solvent concentration of at least 5% by weight of the composition, the polymer having a fluorinated backbone and 3-20 mol-% of pendant groups represented by the formula (I);

—$O_p$—[$CF_2$ $CF(R_f^1)$]—$O_m]_n$—$CF_2CF_2SO_3X$ (I)

wherein $R_f^1$ is F or a perfluoroalkyl radical having 1-10 carbon atoms either unsubstituted or substituted by at least one ether oxygen atoms, m=0 or 1, n=0 to 3, p=0 or 1, and X is H or an alkali metal, and contacting said composition with a silane to form an intimate blend wherein the silane is infused within the voids in the solvent swollen polymer composition, the silane being represented by the formula (IV);

(YO)$_b$Si$R^2R_f^2SO_2Z$ (IV)

wherein b=3, Y is an alkali metal or alkyl radical, $R^2$ is a bidentate alkylene radical either unsubstituted or substituted by at least one ether oxygen atoms with the proviso that $R^2$ has at least two carbon atoms linearly disposed between Si and $R_f^2$, $R_f^2$ is a perfluoroalkylene ether radical either unsubstituted or substituted by at least one ether oxygen atoms, and Z is F or —OM where M is an alkali metal.

13. The process of claim 12 wherein the organic polymer is represented by the formula $$—(CF_2CF_2)_c(CH_2CQ^1{}_2)_d(CQ^2{}_2CQ^2)— \atop O_p—[CF_2CF(R_f^1)—O_m]_n—CF_2CF_2SO_3X$$ (V)

where c≧0, d≧0 and 4≦(c+d)≦199, $Q^1$ and $Q^2$ are F or H, $R_f^1$ is F or a perfluoroalkyl radical having 1-10 carbon atoms either unsubstituted or substituted by one or more ether oxygen atoms, m0 or 1, n0 to 3, p=0 or 1, and X is H or an alkali metal.

14. The process of claim 13 wherein $R_f^1$ is —$CF_3$, p=1, m=1, n=1, and X is H.

15. The process of claim 14 wherein $Q^1$ is H, d≧0, and $Q^2$ is F.

16. The process of claim 13 wherein $Q^1$ is H, $Q^1$ is H, $Q^2$ is H, p=0, $R_f^1$ is F, m=1, n=1, and X is H.

17. The process of claim 12 wherein Y is an alkyl radical and Z is F.

18. The process of claim 17 wherein X is M.

19. The process of claim 17 further comprising the step of contacting the blend with a base having the formula MOH wherein M is an alkali metal.

20. The process of claim 12 further comprising the step of contacting the blend with an acid.

21. The process of claim 19 further comprising the step of contacting the blend with an acid.

22. The process of claim 12 wherein the organic polymer comprises 3-10 mol-% of the pendant group.

23. The process of claim 13 wherein the organic polymer comprises 3-10 mol-% of the pendant group.

* * * * *